United States Patent [19]

Cullen

[11] Patent Number: 5,408,810

[45] Date of Patent: * Apr. 25, 1995

[54] AGRICULTURAL FEED BAGGING MACHINE HAVING BAG RETAINERS THEREON

[75] Inventor: Steven R. Cullen, Astoria, Oreg.

[73] Assignee: Versa Corporation, Astoria, Oreg.

[*] Notice: The portion of the term of this patent subsequent to Mar. 29, 2011 has been disclaimed.

[21] Appl. No.: 200,763

[22] Filed: Feb. 23, 1994

[51] Int. Cl.$^6$ .................. B65B 9/10; B65B 63/02
[52] U.S. Cl. .................. 53/567; 100/100; 53/529
[58] Field of Search .......... 53/527, 530, 567, 575, 53/576; 100/65, 100, 179; 452/22, 35, 45; 141/114

[56] References Cited

U.S. PATENT DOCUMENTS

| | | | |
|---|---|---|---|
| 3,791,593 | 2/1974 | Griffin | 239/667 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,621,666 | 11/1986 | Ryan | 141/114 |
| 4,653,553 | 3/1987 | Cox et al. | 141/114 |
| 4,688,480 | 8/1987 | Ryan | 100/144 |
| 4,724,876 | 2/1988 | Ryan | 141/114 |
| 4,945,715 | 8/1990 | Brodrecht | 53/567 |
| 4,949,633 | 8/1990 | Johnson et al. | 100/65 |
| 5,159,877 | 11/1992 | Inman et al. | 100/144 |
| 5,269,829 | 12/1993 | Meyer | 71/9 |
| 5,295,554 | 3/1994 | Cullen | 180/236 |

Primary Examiner—Lowell A. Larson
Assistant Examiner—Rodney A. Butler
Attorney, Agent, or Firm—Zarley, McKee, Thomte, Voorhees & Sease; Dennis L. Thomte

[57] ABSTRACT

An improved agricultural feed bagging machine having a pair of bag retainers secured to the top wall of the tunnel to prevent the folded bag from being pulled from the tunnel at a rate greater than is necessary. When large agricultural bags are being employed, the bag retainers are mounted on a cradle which may be lifted and positioned on the top wall of the tunnel.

6 Claims, 3 Drawing Sheets

AGRICULTURAL FEED BAGGING MACHINE HAVING BAG RETAINERS THEREON

BACKGROUND OF THE INVENTION

1. Field of the Invention

This invention relates to an agricultural feed bagging machine and more particularly to an agricultural feed bagging machine having a bag retainer positioned on the top wall of the tunnel to prevent the folded bag positioned thereon from sliding off the tunnel at a rate greater than that which is desired.

2. Background Information

Agricultural feed bagging machines have been employed for several years to bag or pack silage or the like into elongated plastic bags. Two of the earliest bagging machines are disclosed in U.S. Pat. Nos. 3,687,061 and 4,046,068. In most prior art bagging machines, the empty plastic bag is folded and is positioned on the tunnel. As the bag is filled with silage or the like, the bag is pulled from the tunnel as the machine moves forwardly. A problem encountered in the prior art machines is that the bags tend to pull from the tunnel at a rate greater than that which is needed. In other words, the bag tends to slide off or pull off as a whole thereby resulting in an improperly filled bag. In the past, attempts have been made to prevent the bag sliding off as a whole by using an elastic stretch cord which is positioned over the bag and the tunnel. The elastic stretch cord is normally attached to one end of the bag pan on one side of the machine and is extended up and over the tunnel and then down to the other side of the bag pan on the other side of the machine.

One problem encountered with the elastic stretch cord is that the cord is flexible and does not offer complete bag retainment. Further, the elastic cords are easily lost or misplaced. Additionally, the cords have to be different lengths for different size tunnels and bag sizes.

SUMMARY OF THE INVENTION

An improved agricultural feed bagging machine is disclosed which includes one or more, preferably two, bag retainers which are mounted on the top wall of the tunnel of the machine. The bag retainers are pivotally secured to the tunnel and are adapted to be pivotally moved to an open position so that the folded bag may be placed adjacent thereto. The bag retainers are then pivotally moved to their closed position. The bag retainers ensure that the bag will only be pulled off the tunnel as is needed. When extremely large bags are being used, the bag retainers are preferably mounted on a bag cradle which may be removably positioned on the top of the tunnel by means of a front-end loader or the like.

It is therefore a principal object of the invention to provide an improved agricultural bagging machine.

A further object of the invention is to provide an improved agricultural bagging machine having at least a pair of spaced-apart bag retainers mounted on the top wall of the tunnel to prevent the bag from being pulled from the tunnel at a rate greater than is that which is necessary.

Yet another object of the invention is to provide a bag retainer for an agricultural bagging machine which may be mounted on a bag cradle to enable the folded bag to be positioned on the tunnel.

These and other objects will be apparent to those skilled in the art.

DESCRIPTION OF THE PREFERRED EMBODIMENT

Figure 1:
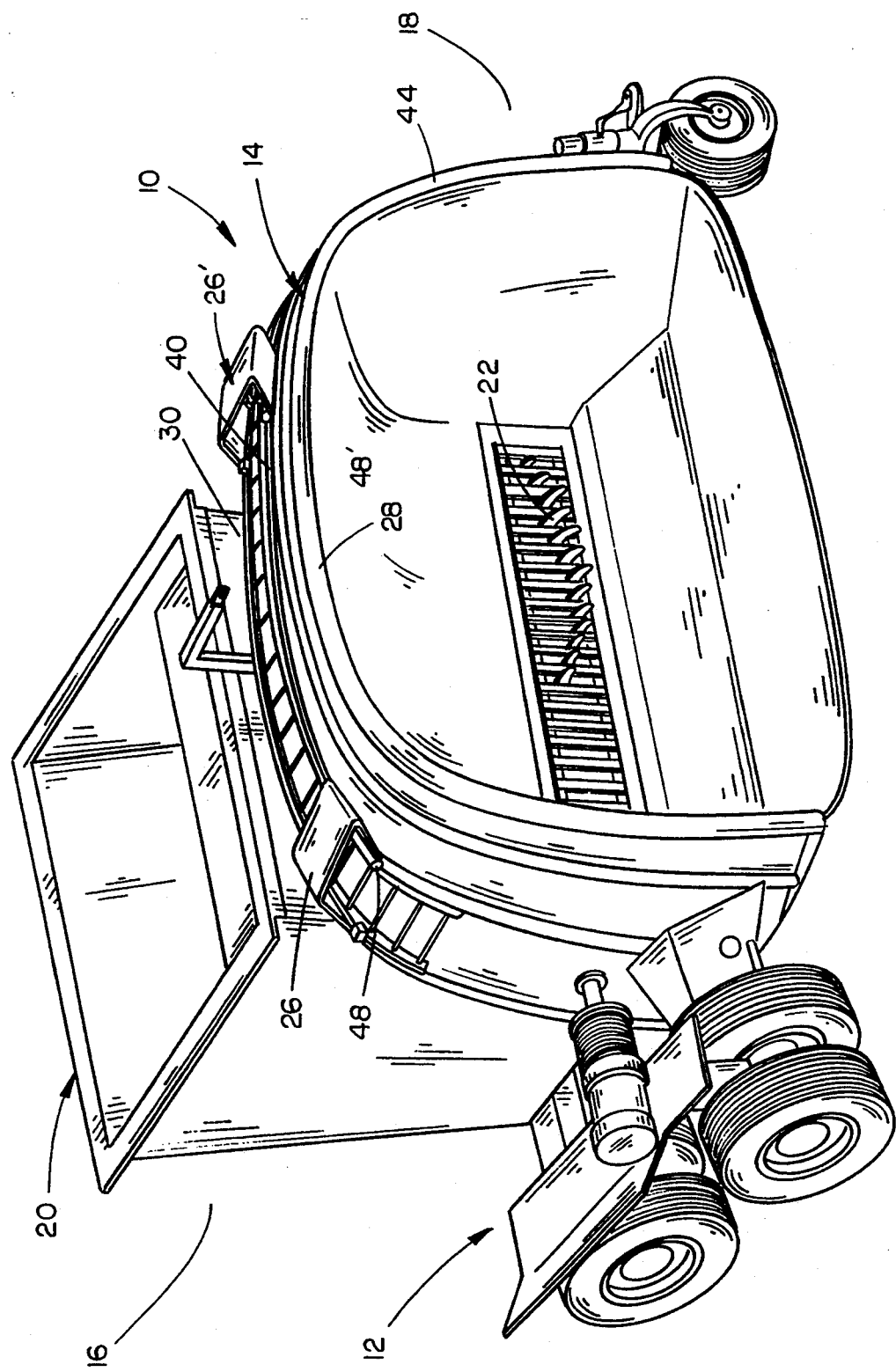
FIG. 1 is a rear perspective view of the improved bagging machine of this invention having the bag retainers of this invention mounted thereon.
Figure 2:
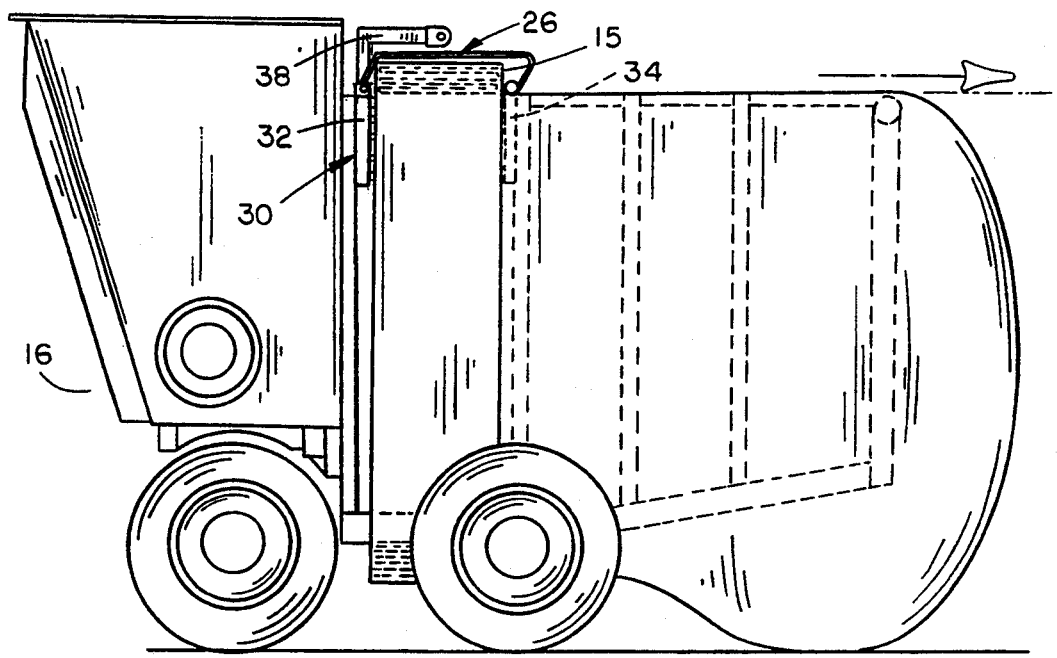
FIG. 2 is a side view illustrating the bag retainers in position to maintain the bag on the tunnel.

The numeral 10 refers to an agricultural feed bagging machine which is substantially conventional in design except for the bag retainer or retainers positioned thereon as will be described hereinafter.

Machine 10 includes a wheeled frame means 12 having a tunnel 14 mounted thereon upon which is normally positioned the open mouth of a conventional agricultural bag 15. Although the preferred embodiment includes a wheeled frame means, a non-wheeled frame means could be employed. For purposes of conciseness, the power means for driving the various components of the machine have not been disclosed since the same does not form a part of the invention. The power means could be an engine mounted on the machine or a PTO shaft connected to a tractor PTO.

For purposes of description, the bagging machine 10 will be described as including a forward end 16 and a rearward end 18. Bagging machine 10 includes a hopper means 20 at the forward end thereof which is adapted to receive the material to be bagged from a truck, wagon, etc. A rotatable rotor 22 of conventional design is illustrated and is located at the lower end of the hopper 20 for forcing the material to be bagged into the tunnel 14 and into the bag 15 in conventional fashion.

In practically all of the prior art agricultural bagging machines, the empty bags 15 are folded and are mounted on the tunnel 14 so that the tunnel 14 receives the open mouth of the folded bag. As previously stated, the only method previously available to prevent the folded bag from pulling from the tunnel at a greater rate than is desirable was to place an elastic stretch cord therearound. However, the elastic stretch cord previously used did suffer from certain drawbacks as previously described.

In an effort to maintain or retain the folded bag 15 on the tunnel 14 while yet permitting the proper amount of bag to be pulled from the tunnel as the bag is being filled has been a challenge. To overcome the problems of the prior art, a bag retainer 26 and preferably two bag retainers 26 and 26' are mounted on the top surface or the top wall 28 of the tunnel 14. Inasmuch as retainer 26' is identical to retainer 26, only retainer 26 will be described in detail. It should also be noted that the bag retainers 26 and 26' may be individually mounted on the top wall 28 of the tunnel 14 or may be mounted on the bag cradle 30 so as to permit the accommodation of large bags as will now be described.

Cradle 30 includes a forward frame member 32 and a rear frame member 34 which are joined by a plurality of spaced-apart braces 36 extending therebetween. Cradle 30 is preferably arcuate in shape so that it conforms to the curvature of the top wall 28 of the tunnel and at least a portion of the upper ends of the side walls of the tunnel. Preferably, a support arm 38 extends upwardly from frame member 32 to enable the entire cradle and the folded bag thereon to be lifted and positioned on the top wall of the tunnel 14.

Figure 3:
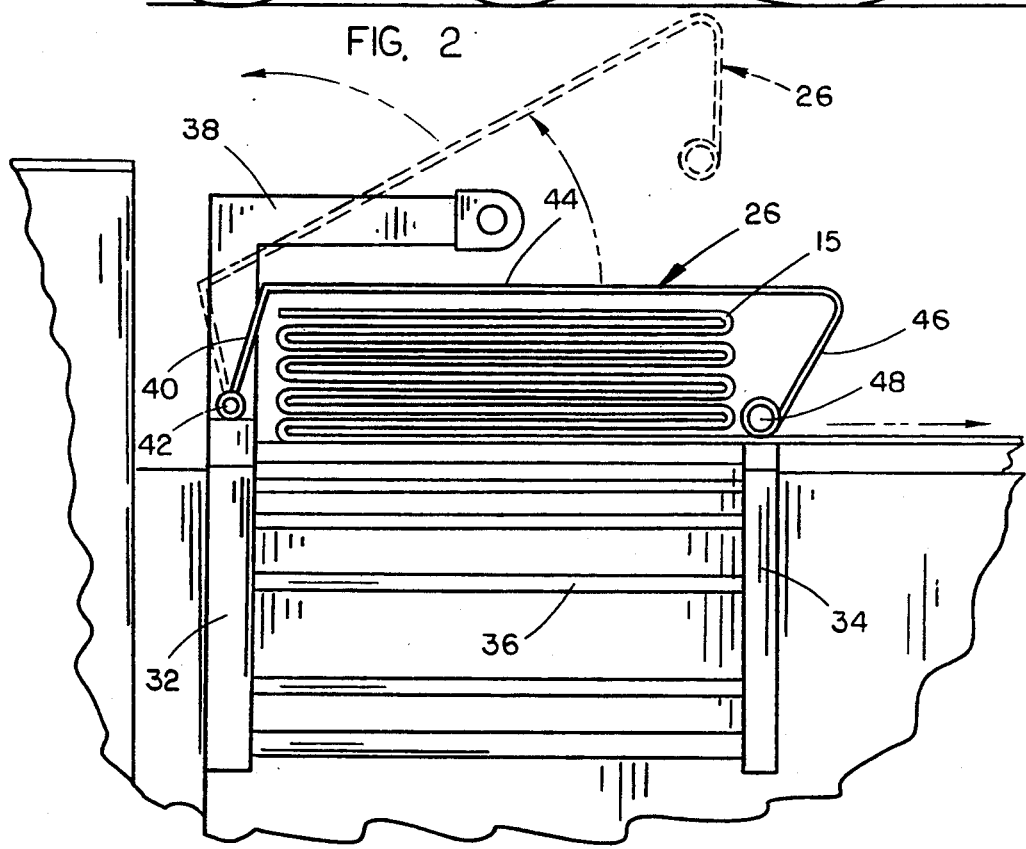
FIG. 3 is an enlarged partial view of FIG. 2 with the broken lines illustrating the alternate position to which one of the bag retainers may be moved.
Figure 4:
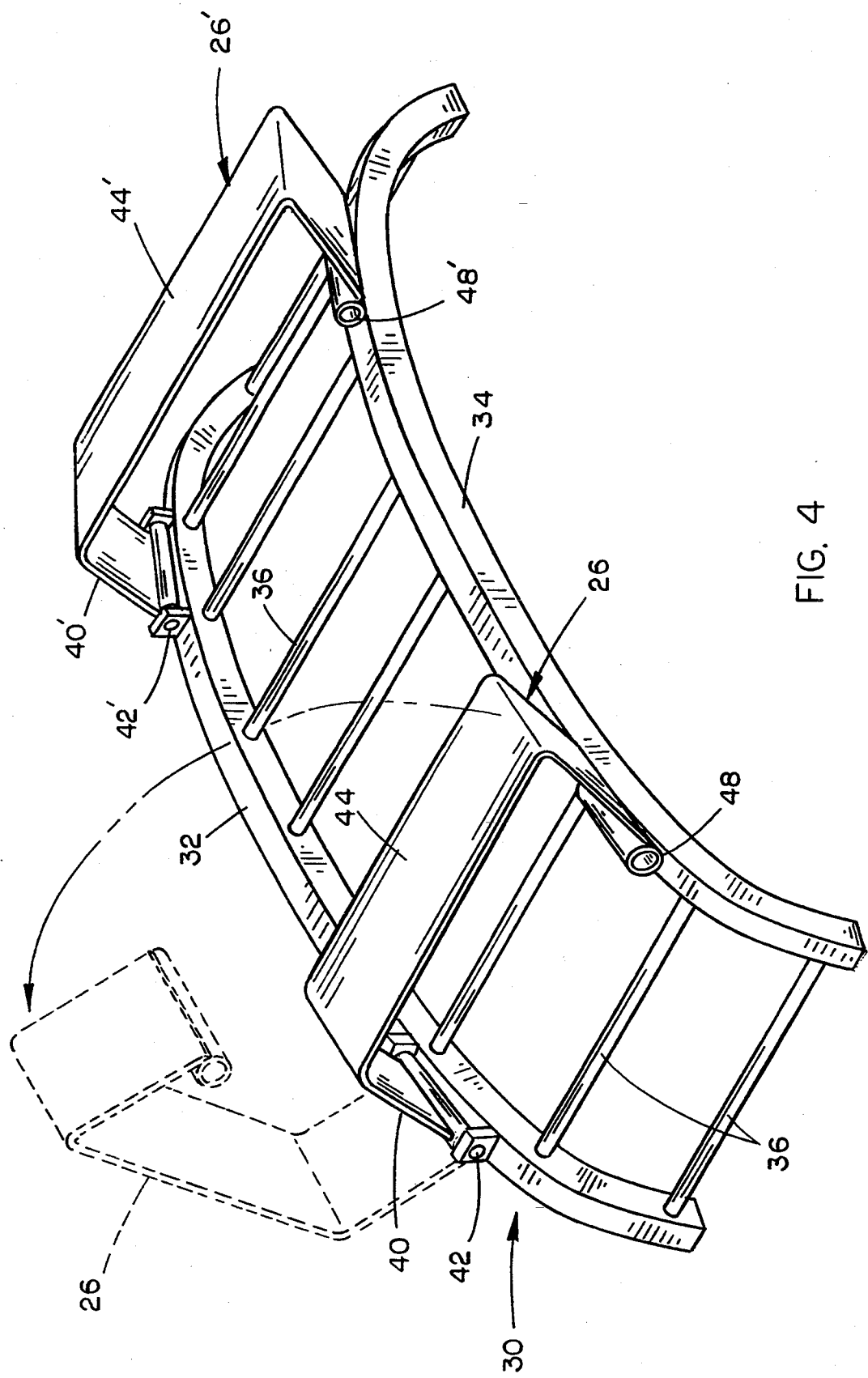
FIG. 4 is an exploded perspective view illustrating the cradle for the bag retainers.

Bag retainer 26 includes a first upstanding retainer portion 40 which is pivotally connected at 42 to front frame member 32. If the cradle 30 is not being utilized, the retainer portion 40 would be pivotally connected to the top wall 28 of the tunnel 14. Retainer portion 44 extends forwardly from the upper end of the retainer portion 40 and terminates in a downwardly extending retainer portion 46 having a tubular member 48 mounted at the lower end thereof as best seen in FIG. 3. FIG. 3 illustrates the bag retainer 26 in its closed or bag retaining position while the broken lines illustrate the bag retainer 26 in its open position.

Assuming that the bag retainers 26 and 26' are mounted on tunnel 14, the retainers 26 and 26' would first be pivotally moved to the open position such as illustrated by broken lines in FIG. 3. The folded bag 15 would then be placed on the cradle in the manner illustrated in FIG. 3. The rearward edge of the folded bag 15 would then be pulled rearwardly from the folded bag to the position where the bag is anchored such as a backstop or the like. The bag retainers 26 and 26' are then closed.

As the machine moves forwardly from the bag, as the bag is being filled, the bag 15 will be pulled from the bag retainers, beneath the tubular members 48 and 48', with the tubular members 48 and 48' preventing the bag from being pulled from the bag retainers as a whole.

When extremely large bags are being handled, it is recommended that the bag retainers be positioned on the cradle 30 as previously described. The cradle 30 would normally be initially supported above the ground by means of the support 38 being suspended from a front-end loader, etc. The bag retainers 26 and 26' would then be opened and the folded bag installed therein. The cradle 30 with the bag 15 positioned thereon would then be lifted and placed on the top wall 28 of the tunnel 14 as illustrated in the drawings. The rearward edge or end of the bag 15 would then be pulled from beneath the tubular members 48 and 48' as previously described.

Although the invention has been described as utilizing a pair of the bag retainers, any number of bag retainers may be employed as may be found to be necessary.

Thus it can be seen that the invention accomplishes at least all of its stated objectives.

I claim:

1. An agricultural bagging machine for bagging agricultural material into agricultural bags having a closed end and an open mouth comprising, a frame means having rearward and forward ends, a hopper on said frame means at the forward end thereof for receiving the material to be bagged, rotor means in communication with said hopper for forcing the material to be bagged rearwardly therefrom, a tunnel on said frame means and having an intake end for receiving the material being forced rearwardly by said rotor and an output end adapted to receive the open mouth of the agricultural bag, said tunnel including a top wall and opposite side walls, and a plurality of substantially inverted U-shaped bag retainers pivotally mounted on said top wall, each of said bag retainers comprising a first upstanding member having a lower end operatively pivotally secured to said top wall of said tunnel and normally extending upwardly therefrom, a second member extending rearwardly from the upper end of said first member and a third member extending downwardly from the rearward end of said second member, said bag retainers being selectively pivotal from a first bag retaining position to a second open position, said first and third members of each of said bag retainers having a height sufficient to receive a folded bag therebeneath when said bag retainer is in its said second position, said second member of each of said bag retainers having a length sufficient to receive a folded bag therebeneath when said bag retainer is in its said second position, said third member of each of said bag retainers having a length sufficient to extend completely over the folded portion of said bag when said bag retainer is in its said first position, and said bag retainers being mounted only on said top wall, each of said bag retainers being selectively pivotally movable from said first bag retaining position to said second open position to permit the bag to be positioned thereon.

2. The bagging machine of claim 1 wherein said bag retainers are mounted on a bag cradle adapted to support a folded bag thereon and adapted to be removably positioned on said top wall of said tunnel.

3. The bagging machine of claim 1 wherein said third member of said bag retainer has a lower end and wherein an elongated tubular member is mounted on the lower end thereof.

4. The bagging machine of claim 3 wherein said tubular member has its longitudinal axis disposed substantially transversely to the length of the bag.

5. The bagging machine of claim 2 wherein said cradle has a shape substantially corresponding to the top wall of said tunnel.

6. The bagging machine of claim 2 wherein a support member extends upwardly from said cradle.

* * * * *